United States Patent [19]

Wiezer et al.

[11] Patent Number: 4,476,302

[45] Date of Patent: Oct. 9, 1984

[54] HIGH-MOLECULAR ESTERS AND URETHANES CONTAINING PIPERIDINE GROUPS, A PROCESS FOR THEIR PREPARATION

[75] Inventors: Hartmut Wiezer, Gersthofen; Gerhard Pfahler, Augsburg, both of Fed. Rep. of Germany

[73] Assignee: Hoechst Aktiengesellschaft, Fed. Rep. of Germany

[21] Appl. No.: 358,315

[22] Filed: Mar. 15, 1982

[30] Foreign Application Priority Data

Mar. 21, 1981 [DE] Fed. Rep. of Germany ....... 3111209

[51] Int. Cl.³ .................. C07D 401/14; C07D 401/12; C07D 401/06; C07D 401/10
[52] U.S. Cl. ..................................... 544/198; 544/222; 544/221; 544/209; 544/212; 524/100; 524/101; 528/423
[58] Field of Search ............... 544/221, 222, 198, 209, 544/212; 528/423; 524/100, 101

[56] References Cited

U.S. PATENT DOCUMENTS

| 4,028,334 | 6/1977 | Chalmers et al. | 544/212 |
| 4,263,434 | 4/1981 | Cassandrini et al. | 544/198 |
| 4,288,593 | 9/1981 | Rody | 544/198 |
| 4,321,374 | 3/1982 | Morimura et al. | 544/198 |
| 4,336,183 | 6/1982 | Nakahara et al. | 544/198 |
| 4,348,493 | 9/1982 | Loffelman | 544/198 |

FOREIGN PATENT DOCUMENTS 2319816 10/1973 Fed. Rep. of Germany.
2422335 11/1974 Fed. Rep. of Germany.
2621870 12/1976 Fed. Rep. of Germany.

*Primary Examiner*—John M. Ford
*Attorney, Agent, or Firm*—Connolly & Hutz

[57] ABSTRACT

New esters and urethanes containing polyalkyl-piperidylaminotriazine groups of the formula

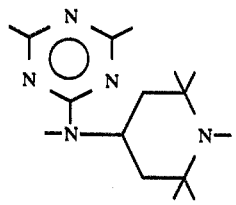

are prepared from carboxylic acid exters or isocyanates and triazinyl alcohols. The compounds are valuable stabilizers for polymeric materials.

4 Claims, No Drawings

HIGH-MOLECULAR ESTERS AND URETHANES CONTAINING PIPERIDINE GROUPS, A PROCESS FOR THEIR PREPARATION

The present invention relates to new highmolecular polyalkylpiperidine compounds of the general formula (I)

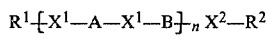

in which n is an integer from 1 to 100, preferably 1 to 25 and especially 1 to 10, and $X^2$ is a bond or —O—, A represents a $C_2$- to $C_{12}$-, preferably $C_2$- to $C_6$- and especially $C_6$-, aliphatic $\alpha,\omega$-dicarbamoyl group, a phenylenedicarbamoyl or $C_7$- to $C_{18}$-araliphatic dicarbamoyl group in which —CO— is attached to $X^1$, it being possible for these groups to be substituted by 1 to 4 $C_1$- to $C_4$-alkyl radicals, a $C_1$- to $C_{18}$-, preferably $C_1$- to $C_{12}$-, aliphatic diacyl, triacyl or tetraacyl, preferably diacyl, radical which can be substituted by up to 2 OH groups, a $C_3$- to $C_{12}$-, preferably $C_4$- to $C_6$- and especially $C_6$-, cycloaliphatic diacyl, triacyl or tetraacyl, preferably diacyl, radical which can be substituted by up to two $C_1$- to $C_4$-alkyl radicals or up to 2 OH groups, a phenyl or naphthyl radical, preferably a phenyl radical, which is substituted by diacyl, triacyl or tetraacyl groups and which can be substituted by 1 or 2 $C_1$- to $C_4$-alkyl groups and/or by an OH group, or a $C_7$- to $C_{14}$-, preferably $C_7$- to $C_9$-, phenylalkyl radical which is substituted by two acyl groups, and, in all the above-mentioned cases in which a radical contains more than 2 acyl groups, those which exceed 2 acyl groups are substituted by the radical —$X^1$—$R^3$, the meaning of which is indicated later in the text, or A represents the radical

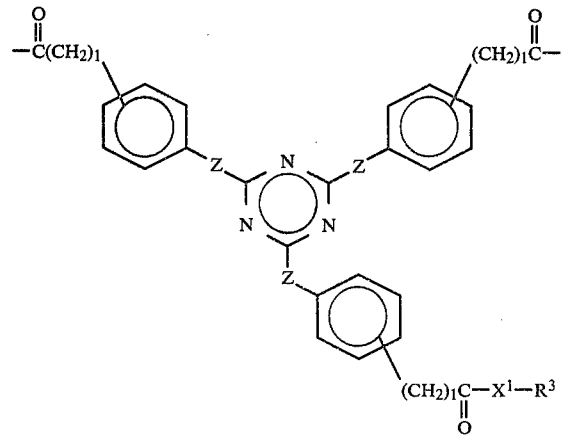

or a radical

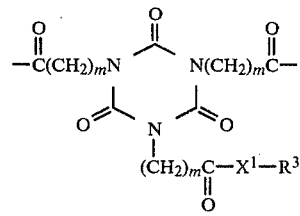

in which radicals l is an integer from 0 to 2, preferably 0, m is an integer from 1 to 5, preferably 1 or 2, but is especially 1, Z is —O— or —NH—, $X^1$ represents —O— or —$NR^{10}$—, as it does also in formula I, and $R^3$ should be methyl, ethyl or a group of the formula (II).

If n is 1, B and $X^2$ represent bonds, $R^1$ and $R^3$ are methyl, ethyl or a group of the formula (II) and $R^2$ denotes a group of the formula (II). Preferably, $R^1$, $R^2$ and $R^3$ represent a group of the formula (II)

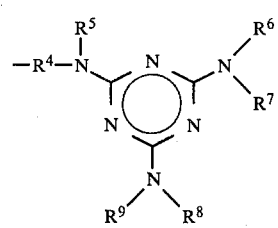

and $X^1$ denotes oxygen or —$NR^{10}$—, preferably oxygen.

If n is $>1$, $X^1$ and $X^2$ are oxygen and B denotes a group of the formula (III), (IV), (V) or (VI).

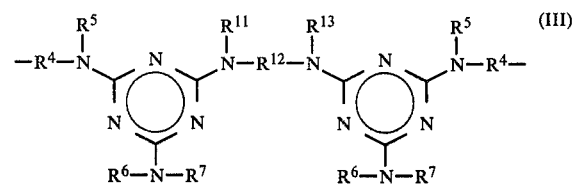

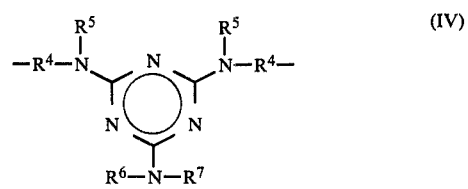

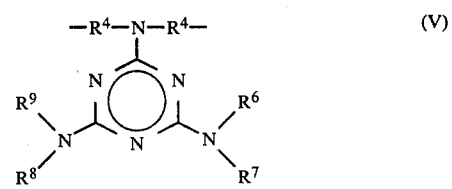

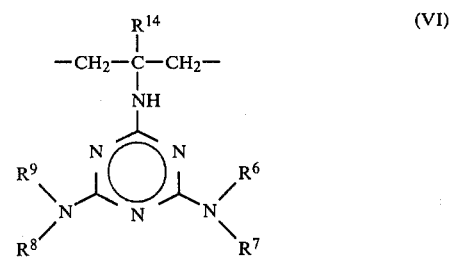

In the formulae (II) to (VI), $R^4$ is a $C_2$- to $C_6$- alkylene group and $R^5$ represents, in particular, hydrogen, $C_1$- to $C_{12}$-alkyl, $C_5$- to $C_{12}$-cycloalkyl or, preferably, a group of the formula (VII)

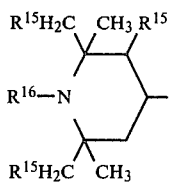 (VII)

in which $R^{15}$ is hydrogen or methyl, preferably hydrogen, and $R^{16}$ is hydrogen, $C_1$- to $C_{12}$-alkyl which can be substituted by 1 or 2 hydroxyl groups, $C_3$- to $C_8$-alkenyl or benzyl, but is preferably hydrogen.

The radicals $R^6$, $R^7$, $R^8$ and $R^9$ are identical or different and denote hydrogen, $C_1$- to $C_{18}$-, preferably $C_1$- to $C_{12}$-and especially $C_1$- to $C_8$-, alkyl radicals which can be substituted by hydroxyl, $C_1$- to $C_{18}$-alkoxy or $C_1$- to $C_4$-dialkylamino, alkyl which is substituted by alkoxy or dialkylamino preferably having 2 to 5 carbon atoms and being substituted by $C_1$- to $C_{18}$-alkoxy, preferably $C_1$- or $C_2$-alkoxy, or by $C_1$- to $C_4$-dialkylamino, preferably $C_1$- or $C_2$-dialkylamino, and denote $C_5$- to $C_{12}$-cycloalkyl, allyl, phenyl which can be substituted by 1 or 2 $C_1$- to $C_8$-alkyl groups and/or by OH, $C_7$- to $C_{14}$-aralkyl, preferably $C_7$- to $C_{14}$-phenylalkyl and especially $C_7$- to $C_9$-phenylalkyl, or a group of the formula (VII) or a group of the formulae (VIII) or (IX).

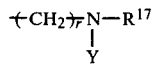 (VIII)

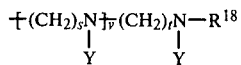 (IX)

In the formulae (VIII) and (IX) r, s and t denote identical or different numbers from 2 to 6, preferably 2 or 3 and v denotes a number from 0 to 3, preferably 0 or 1 and especially 0, the radicals $R^{17}$ and $R^{18}$ are identical or different and represent hydrogen, $C_1$- to $C_{18}$-, preferably $C_1$- to $C_{12}$- and especially $C_1$- to $C_8$-, alkyl, $C_5$- to $C_{12}$-cycloalkyl, $C_7$- to $C_{14}$-aralkyl, especially $C_7$- to $C_9$-phenylalkyl, or a group of the formula (VII) and Y denotes a radical of the formula (X)

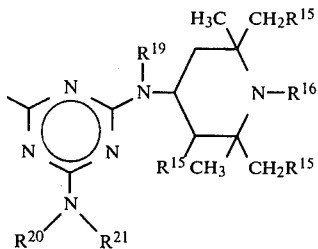 (X)

in which $R^{15}$ and $R^{16}$ have the meanings indicated above and $R^{19}$ and $R^{20}$ have the meanings specified for $R^6$, $R^7$, $R^8$ and $R^9$, excepting those of the formulae (VIII) and (IX), and $R^{21}$ is hydrogen, $C_1$- to $C_{18}$-alkyl, preferably $C_1$- to $C_{12}$-alkyl and especially $C_1$- to $C_8$-alkyl, $C_5$- to $C_{12}$-cycloalkyl, $C_7$- to $C_{14}$-aralkyl, preferably $C_7$- to $C_{14}$-phenylalkyl and especially $C_7$- to $C_9$-phenylalkyl, or, preferably, a group of the formula (VII).

$R^{10}$ denotes a group of the formulae (VIII) or (IX).

$R^{11}$ and $R^{13}$ are identical or different radicals having the same meaning as $R^{17}$ and $R^{18}$.

$R^{12}$ denotes $C_2$- to $C_{18}$-, preferably $C_2$- to $C_{12}$- and especially $C_2$- to $C_6$-, alkylene or $C_2$- to $C_{12}$-bis-(propoxy)-alkylene or $C_6$- to $C_{18}$-, preferably $C_6$- to $C_{12}$-, monocycloalkylene, dicycloalkylene or tricycloalkylene which is unsubstituted or substituted by up to four methyl groups, but is preferably unsubstituted, and in which, in the case first mentioned, two C atoms can be replaced by N atoms which can carry propylene groups, or denotes $C_6$- to $C_{18}$-arylene, preferably phenylene, or $C_7$- to $C_{18}$-aralkylene. The radical

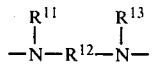

can also represent a piperazinylene radical.

$R^{14}$ is methyl or hydroxymethylene or ethyl.

If n is $>1$, $R^1$ denotes methyl or ethyl or one of the radicals which are indicated under A for carbamoyl groups and which are saturated by —NCO, $R^3$ also denotes methyl or ethyl and $R^2$, as a terminal group, denotes hydrogen.

In the formula (I), at least one radical must represent a group of the formula (VII) or must contain this group.

The new compounds are obtained by reacting diisocyanates of the formula (XIa)

$$ONC-A-NCO \qquad (XIa)$$

or esters of the formula (XIb)

 (XIb)

in which A has the meaning indicated above and R denotes methyl or ethyl, with a compound of the general formula (XII)

$$H-X^1-B-X^2-R^2 \qquad (XII)$$

or a mixture of such compounds, $X^1$, B, $X^2$ and $R^2$ in this formula having the meanings indicated above. If the radical $R^2$ denotes a group of the formula (II), in the event that mixtures are employed, these mixtures can be composed of compounds of the formula (XII), of the formula (XIIa)

$$H-X^1-B-X^2-R^1 \qquad (XIIa)$$

and of the formula (XIIb)

$$H-X^1-B-X^2-R^3 \qquad (XIIb)$$

If B and $X^2$ are bonds and $R^2$ denotes a group of the formula (II), an equimolar to equivalent, preferably equivalent, quantity of (XII) is employed, relative to the functional reactive groups present in (XIa) or (XIb), respectively. If, in formula (XII), $X^2$ is —O—, $R^2$ is H and B is a group of the formulae (III) to (VI), a 0.8- to 1.2-molar quantity, preferably a 0.9- to 1.1-molar quantity and especially a 1-molar quantity, of (XII) is employed, relative to (XIa) or (XIb), respectively. The reaction is carried out in inert organic solvents at temperatures of 70 to 200, preferably 110 to 200 and especially 130° to 180° C., if appropriate in the presence of catalysts.

Examples of suitable solvents are toluene, xylene, mesitylene or dioxane and, for the formation of amides, additionally lower alcohols, such as propanol, butanol or hexanol, or dimethylformamide.

Catalysts which can be used for the formation of urethanes are 1,4-diazabicyclo-[2.2.2]-octane or alkali bases, and, for trans-esterification reactions, NaH, LiNH$_2$, alkali metal alcoholates or titanium tetraalkylates, in each case in quantities of 0.05 to 1.0% by weight, relative to the compound (XII).

The following are examples of starting materials of the formula (XIa):
(1a) Hexanemethylene diisocyanate
(2a) 2,4-Tolylene diisocyanate.

The following are examples of starting materials of the formula (XIb):
1. Diethyl malonate
2. Dimethyl succinate
3. Dimethyl adipate
4. Dimethyl suberate
5. Dimethyl sebacate
6. Dimethyl dodecanedioate
7. Dimethyl terephthalate
8. Dimethyl maleate
9. Dimethyl fumarate
10. Dimethyl itaconate
11. Dimethyl malate
12. Trimethyl 1,2,4-benzenetricarboxylate
13. Tetramethyl 1,2,3,5-benzenetetracarboxylate
14. Dimethyl tetrahydrophthalate
15. Diethyl bis-carboethoxymethylenemalonate
16. 1,3,5-Tris-(carboethoxymethylene) isocyanurate
17. 1,3,5-Tris-(carbomethoxymethylene) isocyanurate
18. 1,3,5-Tris-(carbomethoxyethylene) isocyanurate
19. Tris-2,4,6-[4-(carboethoxy)-phenyleneoxy]-1,3,5-triazine.

The following are examples of starting materials of the formula (XII) which are used for the preparation of compounds of the formula (I) in which $R^1$, $R^2$ and $R^3$ denote radicals of the formula (II):
20. 2-(3-Hydroxypropylamino)-4,6-bis-[N-(2,2,6,6-tetramethyl-4-piperidyl)-amino]-1,3,5-triazine
21. 2-(3-Hydroxypropylamino)-4,6-bis-[N-2,2,6,6-tetramethyl-4-piperidyl)-butylamino]-1,3,5-triazine
22. 2-(3-Hydroxypropylamino)-4,6-bis-[N-(2,2,6,6-tetramethyl-4-piperidyl)-3-methoxypropylamino]-1,3,5-triazine
23. 2-(6-Hydroxyhexylamino)-4,6-bis-[N-(2,2,6,6-tetramethyl-4-piperidyl)-3-methoxypropylamino]-1,3,5-triazine
24. 2-(3-Hydroxypropylamino)-4-octadecylamino-6-[N-(2,2,6,6-tetramethyl-4-piperidyl)-3-methoxypropylamino]-1,3,5-triazine
25. 2-(2-Hydroxyethylamino)-4,6-bis-[N-(2,2,6,6-tetramethyl-4-piperidyl)-3-methoxypropylamino]-1,3,5-triazine
26. 2-(6-Hydroxyhexylamino)-4-[N-(2,2,6,6-tetramethyl-4-piperidyl)-3-dimethylaminopropylamino]-6-[N-(2,2,6,6-tetramethyl-4-piperidyl)-3-methoxypropylamino]-1,3,5-triazine
27. 2-(3-Hydroxypropylamino)-4-butylamino-6-[N-(2,2,6,6-tetramethyl-4-piperidyl)-3-methoxypropylamino]-1,3,5-triazine
28. 2-(2-Hydroxyethylamino)-4-(3-octadecyloxypropylamino)-6-[N-(2,2,6,6-tetramethyl-4-piperidyl)-3-methoxypropylamino]-1,3,5-triazine
29. 2-(3-Hydroxypropylamino)-4-(diethylamino)-6-[N-(2,2,6,6-tetramethyl-4-piperidyl)-butylamino]-1,3,5-triazine
30. 2-(6-Hydroxyhexylamino)-4-benzylamino-6-[N-(2,2,6,6-tetramethyl-4-piperidyl)-3-ethoxypropylamino]-1,3,5-triazine
31. 2-(3-Hydroxypropylamino)-4,6-bis-[N-(2,2,6,6-tetramethyl-4-piperidyl)-octadecylamino]-1,3,5-triazine
32. 2-(3-Hydroxypropylamino)-4,6-bis-{1,9-bis-[2,4-bis-<N-(2,2,6,6-tetramethyl-4-piperidyl)-3-methoxypropylamino>-1,3,5-triazin-6-yl]-1,5,9-triazanon-5-yl}-1,3,5-triazine.

The following are examples of starting materials of the formula (XII) which are used for the preparation of compounds of the formula (I) in which B represents a radical of the formula (III):
33. N,N'-Bis-[2-(3-hydroxypropylamino)-4-<(2,2,6,6-tetramethyl-4-piperidyl)-3-methoxypropylamino>-1,3,5-triazin-6-yl]-N-(2,2,6,6-tetramethyl-4-piperidyl)-1,6-diaminohexane
34. N,N'-Bis-]2-(3-hydroxypropylamino)-4-<(2,2,6,6-tetramethyl-4-piperidyl)-3-methoxypropylamino>-1,3,5-triazin-6-yl]-N,N'-bis-(2,2,6,6-tetramethyl-4-piperidyl)-3(4),8(9)-bis-(aminomethyl)-tricyclo[5,2,1,0$^{2,6}$]-decane mixture of isomers.

The following are examples of starting materials of the formula (XII) which are used for the preparation of compounds of the formula (I) in which B denotes a radical of the formula (IV):
35. 2,4-Bis-(3-hydroxypropylamino)-6-[N-(2,2,6,6-tetramethyl-4-piperidyl)-butylamino]-1,3,5-triazine
36. 2,4-Bis-(2-hydroxypropylamino)-6-[N-(2,2,6,6-tetramethyl-4-piperidyl)-3-methoxypropylamino]-1,3,5-triazine
37. 2,4-Bis-(2-hydroxyethylamino)-6-[N-(2,2,6,6-tetramethyl-4-piperidyl)-butylamino]-1,3,5-triazine
38. 2,4-Bis-(3-hydroxypropylamino)-6-[N-(2,2,6,6-tetramethyl-4-piperidyl)-3-dimethylpropylamino]-1,3,5-triazine
39. 2,4-Bis-(6-hydroxyhexylamino)-6-[N-(2,2,6,6-tetramethyl-4-piperidyl)-3-methoxypropylamino]-1,3,5-triazine.

The following are examples of starting materials of the formula (XII) which are used for the preparation of compounds of the formula (I) in which B is a radical of the formula (V):
40. 2-(Diethanolamino)-4,6-bis-[N-(2,2,6,6-tetramethyl-4-piperidyl)-3-methoxypropylamino]-1,3,5-triazine
41. 2-(Diethanolamino)-4-octadecylamino-6-[N-(2,2,6,6-tetramethyl-4-piperidyl)-3-methoxypropylamino]-1,3,5-triazine
42. 2-(Diethanolamino)-4,6-bis-{1,9-bis-[2,4-bis-<N-(2,2,6,6-tetramethyl-4-piperidyl)-3-methoxypropylamino>-1,3,5-triazin-6-yl]-1,5,9-triazanon-5-yl}-1,3,5-triazine
43. 2-(Diethanolamino)-4-cyclohexylamino-6-[N-(2,2,6,6-tetramethyl-4-piperidyl)-3-methoxypropylamino]-1,3,5-triazine
44. 2-(Diethanolamino)-4-butylamino-6-[N-(2,2,6,6-tetramethyl-4-piperidyl)-3-methoxypropylamino]-1,3,5-triazine The following is an example of a starting material of the formula (XII) which is used for the preparation of compounds of the formula (I) in which B denotes a radical of the formula (V):
45. 2-(Tris-hydroxymethylenemethylamino)-4,6-bis-[N-(2,2,6,6-tetramethyl-4-piperidyl)-butylamino]-1,3,5-triazine.

The following are examples of starting materials of the formula (XII) which are used for the preparation of compounds of the formula (I) in which $X^1$ is —NR$^{10}$—;

46. 1,9-Bis-[2,4-bis-<N-(2,2,6,6-tetramethyl-4-piperidyl)-3-methoxypropylamino>-1,3,5-triazin-6-yl]-B 1,5,9-triazanonane 47. 1,7-Bis-[2,4-bis-<N-(2,2,6,6-tetramethyl-4-piperidyl)-3-methoxypropylamino>-1,3,5-triazin-6-yl]-1,5,9-triazanonane.

Numerous polyalkylpiperidine compounds containing the ester group or the carbamoyl group are already described in the literature. Mention may be made of German Offenlegungsschrift No.2,730,397 (isocyanuric acid derivatives), German Pat. No. 1,929,928 (polyalkylpiperidyl esters), German Offenlegungsschriften No. 2,719,133 and 2,623,422 (polyalkylpiperidyl esters and amides), German Offenlegungsschrift No. 2,640,409 (polyalkylpiperidyl urethanes) and German Offenlegungsschrift No. 2,719,131 (polyalkylpiperidyl polyesters, polyamides and polyurethanes). These compounds, which are completely inadequate in their action, volatility and resistance to being washed out with water, no longer meet the extremely high technical requirements which are now demanded for light stabilizers for synthetic polymers. Recently, triazine derivatives have also been described, which admittedly do not possess the ester or urethane structure which is susceptible to hydrolysis (German Offenlegungsschriften Nos. 2,636,144 and 2,636,130) and thus cannot in themselves be compared in structural terms with the substances according to the invention, but which also do not have a completely satisfactory total pattern of technical performance.

Esters which are attached to the active piperidylamino structural unit are known from European Patent Applications Nos. 3,542 and 3,543. In this case the primary factor is that the actual carrier of the action is blocked, so that the high-molecular structure must first be broken up again into fragments in the stabilizing process. The low-molecular constituents thus formed cause these products also to have the disadvantages listed above of excessively high volatility and extractability by washing.

It was surprising and not to be expected that, in spite of their ester and urethane structure, the new compounds would be superior to those of the state of the art; on the contrary, it would have been expected that the same problems relating to volatility, extractability by washing and inadequate activity as are observed with the compounds of the state of the art mentioned above would occur when they were used. Finally, the superiority of the new esters and urethanes with respect to the products of German Offenlegungsschrift No. 2,719,131, which are also high-molecular, could also not have been foreseen in any way, since both classes of substances are based on similar chemical fundamental structures. Since the compound according to Example 1 of German Offenlegungsschrift No. 2,719,131 can be described as a top-quality product which is already used in industry, it was not to be expected that it would be possible to obtain products which are markedly superior to this product and, in spite of the structural considerations, also prove to be at least on a par with the triazine derivatives mentioned above which have a free piperidine NH group.

The new triazine stabilizers can be incorporated without problems into the polymers to be stabilized and are excellently suitable for stabilizing the latter against oxidative degradation induced by light. In addition to their excellent activity as stabilizers, the new stabilizers are distinguished by their compatibility with the polymers to be stabilized, their resistance to migration caused by leaching with aqueous media, which plays an important part in weathering in the open, their heat stability, even at high processing temperatures, and their low volatility, particularly in comparison with Example 6 of German Offenlegungsschrift No. 2,636,144.

As already stated, the new compounds are used as stabilizers for plastics against damage caused to the latter by the action of oxygen, heat and light. The following are specific examples of such plastics:

Polymers derived from hydrocarbons having single or double unsaturation, for example polyolefins, such as polyethylene, which can optionally be crosslinked, polypropylene, polybut-1-ene, polyisobutene, polymethylbut-1-ene, polymethylpent-1-ene, polyisoprene, polybutadiene, polystyrene, copolymers of the monomers on which the said homopolymers are based, such as ethylene-propylene copolymers, propylene-but-1-ene copolymers, propylene-isobutene copolymers, styrene-butadiene copolymers and terpolymers of ethylene and propylene with a diene, such as, for example, hexadiene, dicyclopentadiene or ethylidene norbornene, and mixtures of the abovementioned homopolymers, such as, for example, mixtures of polypropylene and polyethylene, polypropylene and polybut-1-ene, polypropylene and polyisobutylene or a butadiene-acrylonitrile copolymer and a styrene-butadiene copolymer.

Vinyl polymers containing halogen, such as polyvinyl chloride, polyvinylidene chloride, polyvinyl fluoride, polychloroprene and chlorinated rubbers and also copolymers of vinyl chloride and vinylidene chloride with one another and with other olefinically unsaturated monomers.

Polymers derived from $\alpha,\beta$-unsaturated acids and derivatives thereof, such as polyacrylates and polymethacrylates, polyacrylamides and polyacrylonitrile and copolymers thereof with one another and with other vinyl compounds, such as acrylonitrile-butadiene-styrene copolymers, acrylonitrile-styrene copolymers and acrylonitrile-styrene-acrylic ester copolymers.

Polymers derived from unsaturated alcohols and amines or acyl derivatives or acetals thereof, such as polyvinyl alcohol, polyvinyl acetate, polyvinyl stearate, polyvinyl benzoate, polyvinyl maleate, polyvinyl butyral, polyallyl phthalate, polyallylmelamine and copolymers thereof with other vinyl compounds, such as ethylene/vinyl acetate copolymers.

Homopolymers and copolymers derived from epoxides, such as polyethylene oxide or the polymers which are derived from bis-glycidyl ethers.

Polyacetals, such as polyoxymethylene and polyoxyethylene, and polyoxyethylenes containing ethylene oxide as a comonomer.

Polyurethanes and polyureas.

Polycarbonate.

Polyamides and copolyamides derived from diamines and dicarboxylic acids and/or from aminocarboxylic acids or the corresponding lactams, such as polyamide 6, polyamide 6/6, polyamide 6/10, polyamide 11 and polyamide 12.

Polyesters derived from dicarboxylic acids and dialcohols and/or from hydroxycarboxylic acids or the corresponding lactones, such as polyethylene terephthalate, polybutylene terephthalate and poly-1,4-dimethylolcyclohexane terephthalate.

Crosslinked polymers derived from aldehydes on the one hand and from phenols, ureas and melamines on the other hand, such as phenol-formaldehyde resins, ureaformaldehyde resins and melamine-formaldehyde resins.

Finally, the new compounds can also be employed as stabilizers in the resin and paint industry. Examples of these are thermosetting and thermoplastic acrylic resins which are used for automobile finishes (Encyclopedia of Polymer Science and Technology, Interscience Publishers, New York, Volume 1 (1964), pages 273–276 and Volume 13 (1970), pages 530–532 and "Understanding Paint" by W. R. Fuller, in American Paint Journal Co., St. Louis, 1965, pages 124–135), acrylic resin lacquers, ie. the customary stoving lacquers (described, for example, in H. Kittel's "Lehrbuch der Lacke und Beschichtungen" ("Textbook of Lacquers and Coatings"), Volume 1, Part 2, pages 735 and 742 (Berlin, 1972) and in H. Wagner, H. F. Sarx "Lackkunstharze" ("Synthetic Resins for Paint"), pages 229–235) and, very particularly, mixtures based on a hot-crosslinkable acrylic resin and styrene and also lacquers and coatings based on acrylic/melamine resin and alkyd/acrylic/melamine resin. Lacquers of this type can contain, as further additives, other customary light stabilizers, phenolic antioxidants, pigments, dyestuffs, metal deactivators etc.

A field of particular importance is the stabilization of polyolefins, styrene polymers, polyamides, poly(meth-)acrylates and polyurethanes, for which the compounds are preferentially suitable. Examples of these are polyethylene of high and low density, polypropylene, ethylene-propylene copolymers, polystyrene, styrene-butadiene-acrylonitrile terpolymers, mixtures of polyolefins or of styrene polymers, and polyurethanes based on polyethers or polyesters.

The new stabilizers are incorporated into the polymer compositions by method which are generally customary. The incorporation can be effected, for example, by mixing the compounds and optionally further additives into the melt by the methods customary in the art, before or during shaping, or by applying the compounds as a solution or dispersion to the polymer directly or by mixing the compounds into a solution, suspension or emulsion of the polymer, if appropriate with subsequent evaporation of the solvent. The quantities are 0.01 to 5, preferably 0.05 to 2.5 and especially 0.1 to 1.0, % by weight, relative to the material to be stabilized. The new compounds can also be added in the form of a master batch containing these compounds, for example, in a concentration of 1 to 50, preferably 2.5 to 20, % by weight, to the plastics to be stabilized.

The plastics which have been stabilized by adding the substances according to the invention can, if desired, also contain other known and customary additives, such as, for example, antioxidants based on phenols and sulfides, metal deactivators and light stabilizers, phosphite stabilizers, metal compounds, epoxy stabilizers and polyhydric alcohols (see also German Offenlegungsschrift No. 2,427,853, pages 18–24).

Examples of antioxidants are sterically hindered phenols, such as 2,6-di-tert.-butyl-4-methylphenol, 4,4-butylidene-bis-(2,6-di-tert.-butylphenol), 4,4′-thio-bis-(2-tert.-butyl-5-methylphenol), 2,5-di-tert.-butyl-4-hydroxyanisole, dioctadecyl 2,2-bis-(3,5-di-tert.-butyl-2-hydroxybenzyl)-malonate, 1,3,5-tris-(3,5-di-tert.-butyl-4-hydroxybenzyl)-2,4,6-trimethylbenzene and 2,4,6-tri-(3,5-di-tert.-butyl-4-hydroxybenzyl)-phenol, phenolic triazine compounds, such as 1,3,5-tris-(3,5-di-tert.-butyl-4-hydroxybenzyl) isocyanurate, esters of β-(3,5-di-tert.-butyl-4-hydroxyphenyl)-propionic acid with, for example, octadecanol, pentaerythritol and tris-hydroxyethyl isocyanurate, esters of 3,3-bis-(3-tert.-butyl-4-hydroxyphenyl)-butanoic acid with, for example, ethylene glycol, esters of thiodipropionic acid with fatty alcohols, Ca salts or Ni salts of ethyl 3,5-di-tert.-butyl-4-hydroxybenzyl phosphate, dioctadecyl sulfide and dioctadecyl disulfide.

The UV absorbers and light stabilizers include 2-(2′-hydroxyphenyl)-benztriazoles, such as, for example, the 5-chloro-3′,5′-di-tert.-butyl and 5-chloro-3′,5′-di-tert.-amyl derivatives, 2-hydroxybenzophenones, such as, for example, the 4-heptoxy or 4-octoxy derivative, salicylates, such as octylphenyl salicylate, nickel complexes, such as, for example, with 2,2′-thio-bis-[4-(1,1,3,3-tetramethylbutyl)-phenol], and butylamine or other amines, oxalic acid diamides and sterically hindered amines.

Phosphites which should be mentioned are aliphatic, aromatic or aliphatic-aromatic phosphites, such as, for example, tris-nonylphenyl phosphite, tris-(2,4-di-tert.-butylphenyl) phosphite, tris-(2-tert.-butylphenyl) phosphite or esters of pentaerythritol phosphite.

Metal compounds which are known as stabilizers are to be understood in this connection as meaning: calcium, barium, strontium, zinc, cadmium, magnesium, aluminum and lead soaps of aliphatic carboxylic acids or hydroxycarboxylic acids having about 12 to 32 C atoms, salts of the said metals with aromatic carboxylic acids, such as benzoates or salicylates, and (alkyl)-phenates of these metals, and also organotin compounds, such as, for example, dialkyl tin thioglycolates and carboxylates.

Examples of known epoxy stabilizers are epoxidized higher fatty acids, such as epoxidized soya bean oil, tall oil or linseed oil, or epoxidized butyl oleate and epoxides of long-chain olefins.

Examples of polyhydric alcohols can be pentaerythritol, trimethylolpropane, sorbitol or mannitol, ie. preferably alcohols having 5 or 6 C atoms and 2 to 6 OH groups.

An effective combination of stabilizers for poly-α-olefins, such as, for example, high-pressure, medium-pressure and low-pressure polymers of $C_2$- to $C_4$-α-olefins, in particular polyethylene and polypropylene, or copolymers of such α-olefins, is composed, relative to 100 parts by weight of polymer, of, for example, 0.01 to 5 parts by weight of one of the compounds to be used in accordance with the invention, 0.05 to 5 parts by weight of a phenolic stabilizer, if appropriate 0.01 to 5 parts by weight of a sulfur-containing co-stabilizer and, if appropriate, 0.01 to 3 parts by weight of a basic or neutral metal soap, such as, for example, calcium stearate or zinc stearate or the corresponding oxides, and, if appropriate, 0.01 to 5 parts by weight of a known UV stabilizer, for example benzylidenemalonic acid mononitrile-ester, or the so-called quenchers, such as, for example, nickel chelates. Plasticizers, lubricants, emulsifiers, fillers, such as, for example, chalk, talc, asbestos, pigments, optical brighteners, fireproofing agents and antistatic agents can be regarded as examples of other customary additives.

The plastics which have been stabilized in accordance with the invention can be used in a very wide variety of forms, for example as sheets, fibers, tapes, profiles or binders for paints, adhesives or plastic cements.

The following examples serve to illustrate the invention in greater detail:

EXAMPLES

In the preparation examples which follow, the starting materials employed are characterized by numbers which relate to the numbering of the substances listed on pages 9 to 13.

EXAMPLE 1

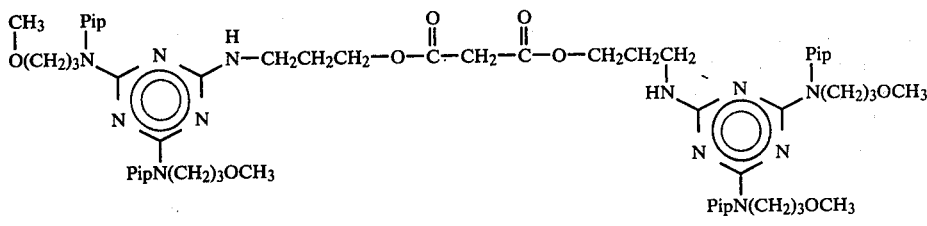

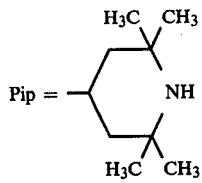

1.6 g (0.01 mole) of the compound 1 were reacted at approx. 140° C. with 12.1 g (0.02 mole) of the compound 22 in 100 ml of xylene under anhydrous conditions and with the addition of approx. 0.1 g of $LiNH_2$. In the space of 3 hours, 0.9 g of ethanol were distilled off. The mixture was then filtered while hot, the solvent was removed by distillation in vacuo and the residue was dried in vacuo. 11.8 g of a yellowish resin, melting point 83°–88° C., of the structure indicated above.

EXAMPLES 2 to 15

The procedure followed was analogous to that of Example 1, using different educts.

| Example No. | Educt 1 Compound No. [g mole] | Educt 2 Compound No. [g mole] | Catalyst | Product of the process M.p. °C. |
|---|---|---|---|---|
| 2 | 5[2.3 0.01] | 25[11.8 0.02] | $LiNH_2$ | 75–84 |
| 3 | 3[1.8 0.01] | 24[12.9 0.02] | " | Wax |
| 4 | 5[2.3 0.01] | 22[12.1 0.02] | " | 64 |
| 5 | 16[3.9 0.01] | 23[18.2 0.03] | " | 98–105 |
| 6 | " | 23[19.4 0.03] | " | 95 |
| 7 | " | 24[19.4 0.03] | " | Resin |
| 8 | 19[5.7 0.01] | 22[18.2 0.03] | " | 75–82 |
| 9 | 10[3.2 0.02] | 29[17.0 0.04] | $Ti[OiC_3H_7]_4$ | Resin |
| 10 | 18[3.9 0.01] | 22[18.2 0.03] | " | 96–104 |
| 11 | 17[5.2 0.015] | 27[20.5 0.045] | " | approx. 282 |
| 12 | 16[3.9 0.01] | 29[13.1 0.03] | $LiNH_2$ | approx. 70 |
| 13 | 9[1.45 0.01] | 22[12.1 0.02] | $Ti[OiC_3H_7]_4$ | 115–123 |
| 14 | 7[1.9 0.01] | 26[13.2 0.02] | " | Resin |
| 15 | 1[1.6 0.01] | 25[11.8 0.02] | " | approx. 60 |

EXAMPLES 16 to 28

The procedure followed was analogous to that of Example 1, but equimolar quantities of the respective educts 1 and 2 were used.

| Example No. | Educt 1 Compound No. [g mole] | Educt 2 Compound No. [g mole] | Catalyst | Product of the process M.p. °C. |
|---|---|---|---|---|
| 16 | 1[3.2 0.02] | 40[12,7 0.02] | $LiNH_2$ | 84–106 |
| 17 | 6[5.2 0.02] | " | " | Resin |
| 18 | 2[3.5 0.02] | 44[9.6 0.02] | " | " |
| 19 | 5[4.6 0.02] | 43[10.1 0.02] | " | " |
| 20 | 1[1.6 0.01] | 42[25.6 0.01] | " | 137–145 |
| 21 | 16[7.8 0.02] | 40[12.8 0.02] | " | 70–8 |
| 22 | 16[3.9 0.01] | 36[4.5 0.01] | " | 97–110 |
| 23 | 17[7.0 0.02] | 39[10.8 0.02] | $Ti[OiC_3H_7]_4$ | 117–125 |
| 24 | 16[7.8 0.02] | 39[10.8 0.02] | $LiNH_2$ | 89–102 |
| 25 | 17[7.0 0.02] | 37[8.8 0.02] | $Ti[OiC_3H_7]_4$ | 82–96 |
| 26 | 16[3.9 0.01] | 34[12.3 0.01] | NaH | 148–161 |
| 27 | 2[1.8 0.01] | 33[10.1 0.01] | $Ti[OiC_3H_7]_4$ | 143–152 |
| 28 | 16[3.9 0.01] | " | $LiNH_2$ | approx. 130 |

EXAMPLE 29

3.4 g (0.02 mole) of hexamethylene diisocyanate were added to 10.1 g (0.02 mole) of the compound 43 in 50 ml of absolute toluene. 0.01 g of 1,4-diazabicyclo-[2.2.2]-octane were added and the mixture was stirred for 8 hours at 105° C. The reaction solution was concentrated and the residue was dried in vacuo.

Yield: 12.9 g of a resin, melting point approx. 168° C.

EXAMPLE 30

9.0 g (0.0035 mole) of the compound 42 were reacted with 0.6 g (0.0035 mole) of hexamethylene diisocyanate analogously to Example 29, the resulting being a resin of melting point 140° C.

EXAMPLE 31

This example shows the volatility of the new triazine stabilizers in comparison with products of the nearest state of the art.

The volatilities were determined in an apparatus for thermogravimetric analysis. For this purpose, equal quantities (500 mg) of the compounds according to the invention and of the comparison substances were heated in a nitrogen atmosphere to 300° C. at a rate of heating of 2K/minute, and the loss of substance in $mg/cm^2$ of sample surface was measured. The results are shown in the table below:

| Stabilizer according to Example | Loss of weight in mg/cm² on reaching ...°C. | | | |
|---|---|---|---|---|
| | 220 | 260 | 300 | 10 minutes at 300° C. |
| 2 | 0.79 | 2.69 | 5.01 | 9.48 |
| 13 | 0.63 | 3.00 | 9.48 | 12.64 |
| Comparison+ | 0.95 | 2.37 | 17.38 | 90.74 |
| Comparison++ | 0.32 | 1.11 | 9.48 | 58.46 |
| Comparison+++ | 0.42 | 3.48 | 10.59 | 17.38 |

+Di-(2,2,6,6-tetramethyl-4-piperidyl) sebacate
++Compound according to Example 1 of German Offenlegungsschrift 2,719,131
+++Compound according to Example 6 of German Offenlegungsschrift 2,636,144

EXAMPLE 32

This example is intended to demonstrate the light-stabilizing action of the new compounds in a poly-α-olefin.

100 parts by weight of polypropylene having a melt index i₅(230° C.) of approx. 6 g/10 minutes (determined as specified in ASTM D 1238-62 T) and a density of 0.90 were mixed with 0.1 part by weight of pentaerythrityl tetrakis-3-(3,5-di-tert.-butyl-4-hydroxyphenyl)-propionate, 0.2 part by weight of calcium stearate and 0.1 part by weight of the stabilizer according to the invention to be tested.

In order to achieve as uniform as possible a distribution on the polymer particles, the stabilizers were dissolved in a solvent and the solution was added dropwise to the polypropylene powder, while stirring, the bulk of the solvent being re-evaporated by simultaneous irradiation with an IR lamp. After approx. 20 minutes the calcium stearate was added and mixing was continued for a further 10 minutes. Residues of solvent were removed by drying at 50° C./120 minutes in a drying cabinet. The polypropylene was injection-molded on a type SP 50 Windsor injection-molding machine at 240° C. to give sheets measuring 60×60×1 mm. Test specimens as specified in DIN 53,455, mode 3, scaled down in a ratio of 1:3, were punched out of these sheets. The test specimens required as comparison samples were prepared analogously, but omitting the stabilizer to be tested or adding the comparison stabilizers, respectively.

The stability to light was determined by subjecting the samples to irradiation with alternating light in a Xenotest 1200 apparatus made by Original Hanau Quarzlampen GmbH. The intensity of the radiation was modulated by UV filters (special filter glass, d=1.7 mm). The stability to light was tested as specified in DIN 53,387 (a dry period of 17 minutes, moistening for 3 minutes, a black body temperature of 45° C. and a relative atmospheric humidity during the dry period of 70 to 75%). The exposure time in hours was measured and the elongation at break was determined at a haul-off rate of 5 cm/minute on a tensile testing machine made by Instron.

| Stabilizer according to Example | Exposure time in hours | Elongation at break determined, as % of initial value |
|---|---|---|
| 2 | 1,400 | >50 |
| 13 | 1,400 | >50 |
| Polypropylene | 260 | 1 |
| Comparison¹ | 320 | 1 |
| Comparison² | 1,400 | 50 |
| Comparison³ | 600 | 1 |

¹without stabilizer
²compound according to Example 6 of German Offenlegungsschrift 2,636,144
³compound according to Example 1 of German Offenlegungsschrift 2,719,131

EXAMPLE 33

The constituents of the formulation indicated below were mixed into polypropylene (®Hostalen PPU VP 1770 F made by Hoechst AG) of melt index MFI 190/5=1.9 g/10 minutes, using a laboratory high-speed mixer. The mixture was converted into granules, which were melted in a laboratory extruder under the customary processing conditions and spun, via a spinning pump having an eight-orifice spinning head, into monofilaments which were subsequently stretched in a ratio of 1:3, texturized to give yarn of 40 dtex and woven into test fabrics.

100 parts by weight of polypropylene, 0.2 part by weight of calcium stearate, 0.1 part by weight of ethylene glycol 3,3-bis-(3-tert.-butyl-4-hydroxyphenyl)-butanoate, 0.1 part by weight of dioctadecyl disulfide and 0.3 part by weight of the stabilizer to be tested.

The fabric samples were mounted on a perforated piece of cardboard in such a way that a free aperture with a diameter of approx. 15.5 mm was left. The test specimens were exposed in this form to radiation in the Xenotest X 1200, as described in the preceding example. At specific intervals of time, the fabrics were subjected to load at their centers by means of a weight of diameter 6 mm, exerting a pressure of 0.1N/mm². The point at which the weight broke through was taken as the time of failure.

| Stabilizer according to Example | Exposure time in hours |
|---|---|
| 2 | 3,100 |
| 13 | 3,200 |
| Polypropylene | <280 |
| Comparison¹ | 400 |
| Comparison² | 1,400 |
| Comparison³ | 3,000 |

¹without stabilizer
²compound according to Example 1 of German Offenlegungsschrift 2,719,131
³compound according to Example 6 of German Offenlegungsschrift 2,636,144

EXAMPLE 34

The stabilized granules, prepared as in the preceding example, were processed on a laboratory film-blowing machine (screw diameter 25 mm, length 20 D; temperature program 200°, 240°, 250° and 255° C.) to give blown films having a thickness of approx. 70 μm. These films were subjected to artificial weathering in the Xenotest X 1200, as described in Example 32. The carbonyl number was determined, as a characteristic of damage, by a method modeled on DIN 53,383, Part 2. (This number is defined for polypropylene as the ratio of the extinction values at 1715 cm⁻¹ and 1524 cm⁻¹). At a CO number >2, the test specimens began to decompose into powder.

| Stabilizer according | C = 0 number after ... hour | | | |
| --- | --- | --- | --- | --- |
| to Example | 500 | 1000 | 2000 | 2500 |
| 2 | <0.1 | <0.1 | 0.4 | 0.9 |
| 13 | <0.1 | <0.1 | 0.5 | 1.0 |
| Polypropylene | >2 | | | |
| Comaprison[1] | >2 | | | |
| Comparison[2] | | >2 | | |
| Comparison[3] | <0.1 | <0.1 | 0.4 | 0.9 |

[1], [2] and [3] corresponding to the comparison samples of Example 33.

We claim:

1. A polyalkylpiperidine compound of the formula (I)

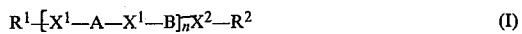

in which n is an integer from 1 to 100;

$X^2$ is a bond or —O—;

A represents a $C_2$- to $C_{12}$-aliphatic $\alpha,\omega$-dicarbamoyl group, a phenylenedicarbamoyl group or a $C_7$- to $C_{18}$-araliphatic dicarbamoyl group in which —CO— is attached to $X^1$, it being possible for these groups to be substituted by 1 to 4 $C_1$- to $C_4$-alkyl radicals, or A is a $C_1$- to $C_{18}$-aliphatic diacyl, triacyl or tetraacyl radical which can be substituted by up to two OH groups, or A is a $C_3$- or $C_{12}$-cycloaliphatic diacyl, triacyl or tetraacyl radical which can be substituted by up to two $C_1$- to $C_4$-alkyl radicals or up to two OH groups, or A is a phenyl or naphthyl radical which is substituted by a diacyl, triacyl or tetracyl group and which can be substituted by 1 or 2 $C_1$- to $C_4$-alkyl groups and/or by an OH group, or A is a $C_7$- to $C_{14}$-phenylalkyl radical which is substituted by 2 acyl groups, and, in all the above-mentioned cases in which a radical contains more than 2 acyl groups, those exceeding 2 are substituted by the radical —$X^1$—$R^3$, or A is a radical of the formula

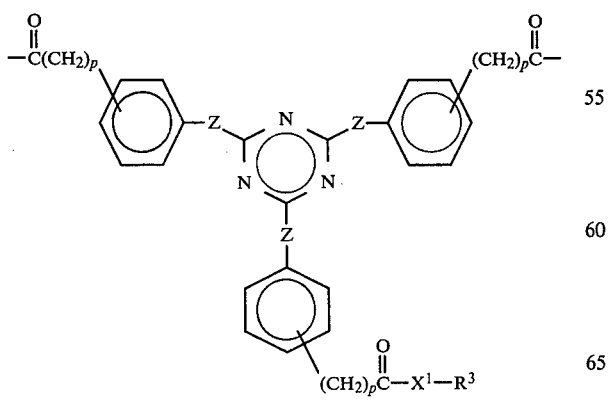

or a radical of the formula

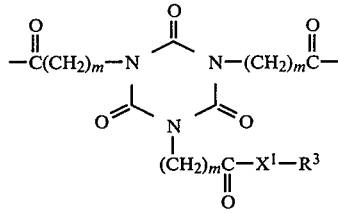

wherein p is an integer from 0 to 2, m is an integer from 1 to 5 and Z is —O— or —NH—;

$X^1$ represents —O—;

$R^3$ is methyl, ethyl or a group of the formula (II);

$R^1$ has the meaning indicated for $R^3$ or that of a radical A having carbamoyl groups and saturated by —NCO; and $R^2$ is hydrogen or a group of the formula (II)

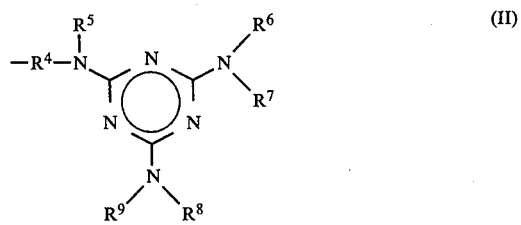

B represents a bond or a group of the formulae (III), (IV), or (V)

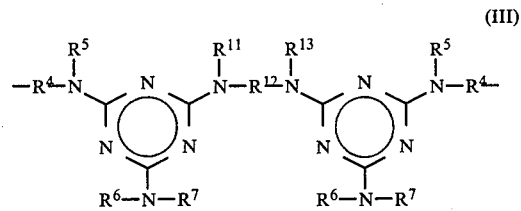

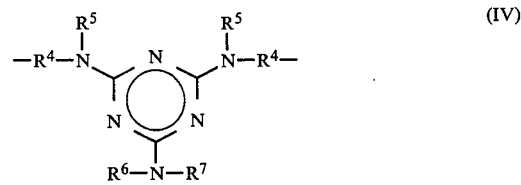

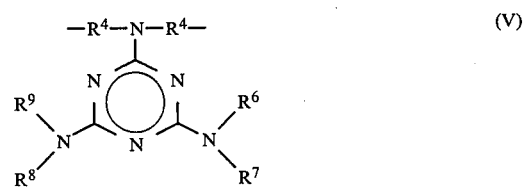

wherein $R^4$ is a $C_2$- to $C_6$- alkylene group;

$R^5$ represents hydrogen, $C_1$- to $C_{12}$-alkyl, $C_5$- to $C_{12}$-cycloalkyl or a group of the formula (VII)

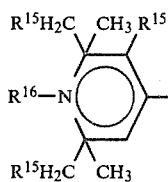 (VII)

wherein $R^{15}$ is hydrogen or methyl and $R^{16}$ is hydrogen, $C_1$- to $C_{12}$-alkyl which can be substituted by 1 or 2 hydroxyl groups, $C_3$- to $C_8$-alkenyl or benzyl;

$R^6$, $R^7$, $R^8$ and $R^9$ are identical or different and represent hydrogen, $C_1$- to $C_{18}$-alkyl which can be substituted by hydroxyl, $C_1$- to $C_{18}$-alkoxy or $C_1$- to $C_4$-dialkylamino, $C_5$- to $C_{12}$-cycloalkyl, allyl, phenyl which can be substituted by 1 or 2 $C_1$- to $C_8$-alkyl groups and/or by OH, $C_7$- to $C_{14}$-aralkyl, a group of the formula (VII) or a group of the formulae (VIII) or (IX)

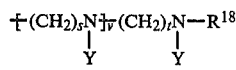 (VIII)

 (IX)

in which r, s and t are identical or different numbers from 2 to 6;

v is an integer from 0 to 3;

$R^{17}$ and $R^{18}$ are identical or different radicals which can be hydrogen, $C_1$- to $C_{18}$-alkyl, $C_5$- to $C_{12}$-cycloalkyl, $C_7$- to $C_{14}$-aralkyl or a group of the formula (VII); and Y is a radical of the formula (X)

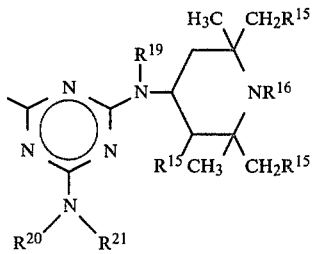 (X)

wherein $R^{19}$ and $R^{20}$ have the meanings given for $R^6$, $R^7$, $R^8$ and $R^9$, excepting those of the formulae (VIII) and (IX); and $R^{21}$ is hydrogen, $C_1$- to $C_{18}$-alkyl, $C_5$- to $C_{12}$-cycloalkyl, $C_7$- to $C_{14}$-aralkyl or a group of the formula (VII);

$R^{10}$ is a group of the formulae (VIII) or (IX);

$R^{11}$ and $R^{13}$ are identical or different radicals having the same meaning as $R^{17}$ and $R^{18}$;

$R^{12}$ represents $C_2$- to $C_{18}$-alkylene or $C_2$- to $C_{12}$-bis-(propoxy)-alkylene or $C_6$- to $C_{18}$-monocycloalkylene, dicycloalkylene or tricycloalkylene which is unsubstituted or substituted by up to four methyl groups and in which, in the definition first mentioned, two C atoms can be replaced by N atoms which can carry propylene groups, or $R^{12}$ represents $C_6$- to $C_{18}$-arylene or $C_7$- to $C_{18}$-aralkylene, or the radical

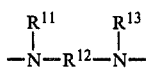

represents a piperazinylene radical, and $R^{14}$ is methyl, hydroxymethylene or ethyl, with the proviso that in formula (I) at least one radical represents a group of the formula (VII) or contains this group.

2. A process according to claim 1, wherein B of formula XII is a bond or a group of said formulas IV or V.

3. A polyalkylpiperidine compound according to claim 1, where B of formula I is a bond or a group of said formulas IV or V.

4. A process for the preparation of the polyalkylpiperidine compounds as claimed in claim 1, which comprises reacting a diisocyanate of the formula (XIa)

 (XIa)

in which A has the meaning indicated in claim 1 in an inert organic solvent at a reaction temperature of 70° to 200° C., with a compound of the general formula (XII)

 (XII)

wherein $X^1$, $X^2$, B and $R^2$ in this formula have the meanings indicated in claim 1.

* * * * *

UNITED STATES PATENT AND TRADEMARK OFFICE
CERTIFICATE OF CORRECTION

PATENT NO. : 4,476,302
DATED : OCTOBER 9, 1984
INVENTOR(S) : WIEZER ET AL

It is certified that error appears in the above-identified patent and that said Letters Patent is hereby corrected as shown below:

Col. 17, line 5, the formula should read:

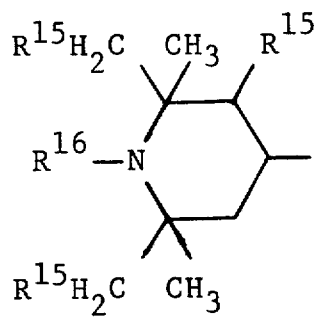

Signed and Sealed this

Eighteenth Day of June 1985

[SEAL]

Attest:

DONALD J. QUIGG

Attesting Officer     Acting Commissioner of Patents and Trademarks